3,560,055
LOCOMOTIVE BRAKE CONTROL SYSTEM SUITED FOR REMOTE MULTIPLE UNIT OPERATOR
Robert J. Worbois, Irwin, Pa., assignor to Westinghouse Air Brake Company, Wilmerding, Pa., a corporation of Pennsylvania
Filed May 9, 1969, Ser. No. 823,307
Int. Cl. B60t 13/68
U.S. Cl. 303—20                                    9 Claims

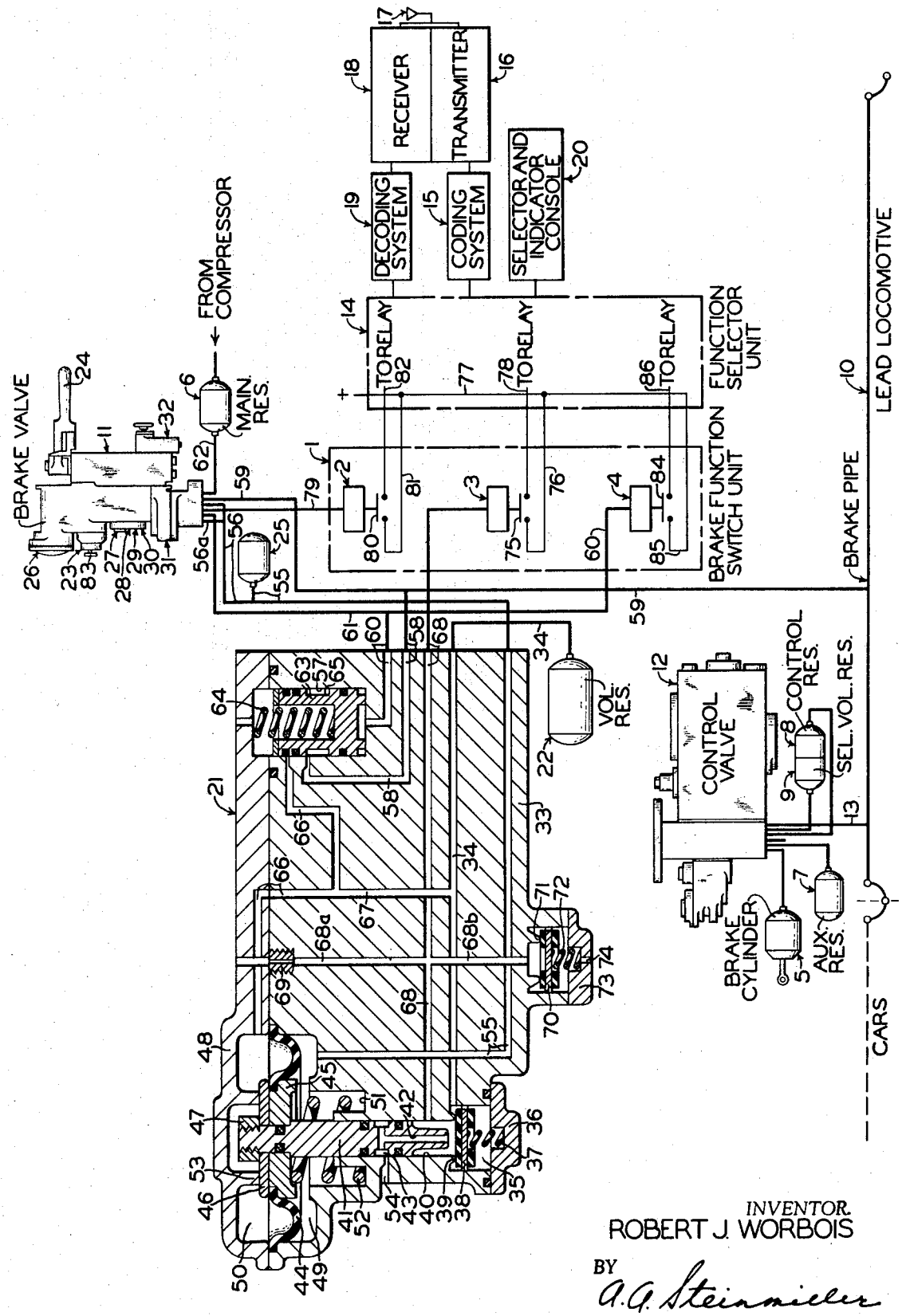

ABSTRACT OF THE DISCLOSURE

Brake control apparatus for the lead locomotive of a multiple unit locomotive control system wherein the brake valve on the lead locomotive is manually operable conventionally to control application and release of the brakes on the forward portion of the train from the lead locomotive and, in a novel manner, also to effect corresponding control (via radio-transmitted signals initiated by manual operation of the brake valve on the lead locomotive) of the brakes on the remaining portion of the train from the brake valve on a slave locomotive remotely located in the train. Switch devices selectively operated in correspondence to the operation of the brake valve on the lead locomotive establish suitable control circuitry for radio transmission of appropriate brake control signals from the lead to the slave locomotive. One of the switches is controlled through an intermediate valve means so as to cause reduction of equalizing reservoir pressure on the slave locomotive in correspondence with that on the lead locomotive thereby initiating a service application of the brake on the train as the slave locomotive concurrently with that initiated at the lead locomotive.

BACKGROUND OF INVENTION

There are presently in use on some American railroads so-called RMU (remote multiple unit) brake control systems capable of effecting, via radio-communicated signals, simultaneous operation of brake controls on one or more slave locomotives located in spaced relation along the length of a train by operation of the brake controls on the lead locomotive. In one such brake control system, the lead locomotive is provided, in addition to the usual engineer's brake valve, with a manually operated push button type brake control console the manual operation of which simultaneously effects electro-pneumatic control of pressure in an equalizing reservoir and the brake pipe on the lead locomotive and also, via radio-communicated signals, control of pressure in an equalizing reservoir and the brake pipe on the slave locomotive, whereby operation of the brake equipment on those cars located between the slave locomotive and the end of the train occurs substantially simultaneously with operation of the brake equipment on those cars located intermediate the lead and slave locomotives. The additional control equipment to insure that a locomotive is adaptable for use as the lead locomotive in RMU operation represents not only additional equipment cost but additional difficulties in servicing and maintaining the equipment.

Accordingly, it is the purpose of this invention to provide a locomotive control equipment suitable for use on the lead locomotive in RMU operation without the additional separate control equipment including a manually operated push buttom type brake control console.

SUMMARY OF INVENTION

According to the present invention, a novel locomotive brake control equipment suited for RMU operation is provided in which the conventional engineer's brake valve is employed for RMU operation, that is control of the brakes on the lead locomotive and on the slave locomotives in the same train, without the addition of a separate push button type brake control console. This is made possible by the provision of a brake function switch unit, including a plurality of fluid pressure operated switches operable selectively in accordance with manual operation of the brake valve handle to its various brake control positions, in which the brake valve functions in its normal manner to control the pressure in the equalizing reservoir on the lead locomotive for brake control purposes and at the same time, via radio-communicated signals initiated by operation thereof, effect similar variation of the pressure in the equalizing reservoir of the slave locomotives for corresponding simultaneous brake control from the slave locomotives.

In the accompanying drawing:

The single figure is a diagrammatic view of the brake control equipment embodying the invention employed on a locomotive when it is used as the lead locomotive in RMU operation.

As shown in the drawing, the conventional brake control equipment heretofore provided on a locomotive when it is used as the lead locomotive in remote multiple unit operation is modified by the substitution of a brake function switch unit 1, embodying three fluid pressure operated switches 2, 3 and 4, in lieu of the heretofore known and used manually operable brake control console. The brake control console embodied a plurality of push-button type of switches manually operated to effect brake applications and brake releases on the plurality of locomotives and cars comprising the train, it being understood that operation of the brake equipment on the slave locomotive or locomotives and those cars comprising the portion of the train coupled to the most remote slave locomotive is effected via radio-transmitted signals. In order to insure operation of the brake equipment on the lead locomotive and the forward portion of the train in response to manual operation of the brake control console, the heretofore used lead locomotive brake control equipment embodied therein an electro-pneumatic brake control center which it will be understood is unnecessary with the lead locomotive brake control equipment constituting the present invention as will be made more clearly apparent hereinafter.

The brake control equipment constituting the present invention further comprises, for pneumatically controlling the brakes on the lead locomotive, a brake cylinder 5, a plurality of reservoirs including a main reservoir 6, an auxiliary reservoir 7, a control reservoir 8 which is combined with a selector volume reservoir 9 into a two-compartment reservoir, a brake pipe 10 that extends from end to end of the locomotive and at one end is coupled to the train brake pipe by the usual hose and hose couplings, an engineer's brake valve 11 operative to control the pressure in the brake pipe 10, and a fluid pressure brake control valve 12 that is connected by a branch pipe 13 to the brake pipe 10.

In order to effect operation of the brake equipment on one or more slave locomotives via radio signals transmitted thereto from the lead locomotive, the brake control equipment embodying the present invention further includes a function selector unit 14 having a plurality of electrical relays, the pick-up circuits of three of which are controlled respectively by the three hereinbefore-mentioned fluid pressure operated switches 2, 3 and 4, a coding system 15 for receiving the output information of the function selector unit 14 and preparing this information for transmittal to a slave locomotive via a radio transmitter 16 having an antenna 17. This brake equipment on the lead locomotive further comprises a radio receiver 18 for receiving via antenna 17 information in the form of radio signals transmitted from the slave locomotive regarding the status of this locomotive, and converting these radio signals to electrical inputs which are fed to a decoding system 19 that in turn transmits the information regarding the slave locomotive to the function selector unit 14 which coordinates this information and furnishes it to a selector and indicator console 20 for display.

In order to control operation of the fluid pressure operated switch 3, the novel brake control equipment on the lead locomotive includes a differential sensing device 21 which is operative to effect the supply of fluid under pressure from a normally charged volume reservoir 22 to the switch device 3 so long as a self-lapping regulating or control valve 23 of the engineer's brake valve 11 is effective, in response to movement of a handle 24 of this brake valve 11 from its release position to a chosen position in its application zone, to release fluid under pressure from an equalizing reservoir 25 to atmosphere.

The engineer's brake valve 11 may be, such as, for example, the No. 26 type of self-lapping brake valve manufactured by the Westinghouse Air Brake Division of Westinghouse Air Brake Company, a subsidiary of American Standard, Inc.

In addition to the control valve 23, the brake valve 11 comprises a relay valve 26, a brake pipe cut-off valve 27, a vent valve 28, an emergency valve 29, a suppression valve 30, an equalizing reservoir cut-off valve 31, and a manually positionable selector valve 32 for selectively conditioning the brake valve 11 for effecting either direct release operation of the brake control valve on each car in a train of cars hauled by a locomotive provided with the engineer's brake valve 11, if each car is provided with a direct release type brake control valve, or graduated application and graduated release operation of the brake control valve on each car if each car is provided with a graduated release type brake control valve, for cutting out control of brake pipe pressure by the brake valve 11 for remote multiple unit or trailing (pusher) unit operation, or for conducting a brake pipe leakage test. The vent valve 28 forms no part of the present invention and will not be described in detail herein.

The brake control valve 12 may be of any suitable type, such as, for example, a 26–F type of brake control valve manufactured by the aforesaid Westinghouse Air Brake Division of Westinghouse Air Brake Company.

The function selector unit 14 may be such as, for example, a A–3–A type of selector unit manufactured by the aforesaid company.

The coding system 15, the transmitter 16, the receiver 18 and the decoding system 19 are all embodied in a single coding cabinet and constitute the No. 580 solid state code system manufactured by the Signal & Communications Division of Westinghouse Air Brake Company, a subsidiary of American Standard, Inc.

The antenna 17 may be such as, for example, a 6 AN–1 antenna manufactured by Antenna Specialists Company. This antenna 17 is connected to the transmitter 17 and receiver 18 by a suitable cable.

The selector and indicator console 20 may be such as, for example, an A–2 type of selector and indicator console manufactured by the Air Brake Division of Westinghouse Air Brake Company, a subsidiary of American Standard, Inc.

The differential sensing device 21 comprises a casing 33 having therein a passageway 34 which at one end opens into a chamber 35 formed by the cooperative relationship of the casing 33 and a first bottom cover 36 secured to the casing 33 by any suitable means (not shown). The opposite end of the passageway 34 is connected by a correspondingly numbered pipe to the volume reservoir 22. Disposed in the chamber 35 is a spring 37 which is effective to normally bias a preferably disc-shaped check valve 38 against a valve seat 39 formed at the lower end of a bore 40 formed in the casing 33.

Slidably mounted in the bore 40 is a spool-type valve 41. The lower end of the spool valve 41 is provided with a counterbore 42 at the upper end of which is a cross-drilled bore that opens to an elongated annular groove 43 formed on the spool valve 41. The upper end of the valve 41 is operatively connected to the center of a flexible diaphragm 44 by means of a pair of followers 45 and 46, disposed respectively on the opposite sides of the diaphragm, and a nut 47. The outer periphery of the diaphragm 44 is rigidly clamped between the casing 33 and a top cover 48 secured to the casing 33 by any suitable means (not shown). The diaphragm 44 cooperates respectively with the casing 33 and the top cover 48 to form on opposite sides of the diaphragm 45 two chambers 49 and 50. Disposed in the chamber 49 in surrounding relation to the valve 41 and interposed between the follower 45 and a shoulder 51 formed on the casing 33 is a spring 52 which is effective to bias the diaphragm 44 and the valve 41 in an upward direction to the position in which they are shown in the drawing, in which position the diaphragm follower 46 abuts an annular stop 53 formed on the top cover 48. In this position of the valve 41, the counterbore 42, the cross-drilled bore into which counterbore 42 opens, and the peripheral annular groove 43 opens the interior of the bore 40 below the lower end of the valve 41 to atmosphere through a passageway 54 extending from the exterior surface of the casing 33 through this casing and opening at the surface of the bore 40 opposite the groove 43.

Opening into the chamber 49 at the lower side of the diaphragm 44 is one end of a passageway 55 that extends through the casing 33 and is connected by a correspondingly numbered pipe to the hereinbefore-mentioned equalizing reservoir 25. Connected to the pipe 55 intermediate the ends thereof is one end of a pipe 56 the opposite end of which is connected to a corresponding passageway (not shown) in the engineer's brake valve 11, which passageway opens in a chamber at the left-hand side of a diaphragm (not shown) of the relay 26, it being understood of course that the chamber at left-hand side of the diaphragm of the relay of the 26 type of engineer's brake valve device is always charged to the pressure in the equalizing reservoir. A branch pipe 56a is connected at one end to the pipe 56 intermediate the ends thereof and at the opposite end to a corresponding passageway (not shown) in the brake valve 11 which passageway opens into the delivery chamber of the control valve 23.

As shown in the drawing, the casing 33 is provided with a bottom bore 57 into which opens intermediate the ends of this bottomed bore 57 and at the wall surface thereof, one end of a passageway 58 that extends through the casing 33 and is connected by a correspondingly numbered pipe to a branch pipe 59 intermediate the ends thereof. One end of this branch pipe 59 is connected to the hereinbefore-mentioned brake pipe 10 and the opposite end is connected to a corresponding passageway (not shown) in the brake valve 11 which passageway is connected via the vent valve 28 and brake pipe cut off valve 27 to the delivery chamber (not shown) of the relay valve 26 and also to the chamber at the right-hand side of the hereinbefore-mentioned diaphragm of this relay valve. Consequently, the chamber at the right-hand side of this diaphragm is subject to brake pipe pressure and the chamber at the left-hand side is subject to equalizing reservoir pressure.

Opening into the bottom of the bottomed bore 57 is one end of a passage 60 that extends through the casing 33 and is connected by a correspondingly numbered pipe to the hereinbefore-mentioned fluid pressure operated switch 4. Connected to the pipe 60 intermediate the ends thereof is one end of a pipe 61 the opposite end of which is connected to a corresponding passageway (not shown) in the engineer's brake valve 11 which passageway leads to the suppression valve 30. It will be understood that while the handle 24 of the engineer's brake valve 11 occupies its brake release position, fluid under pressure is supplied from the main reservoir 6 via a pipe 62 and a corresponding passageway (not shown) in the brake valve 11, the suppression valve 30, the pipe 61 and the pipe 60 to the fluid pressure operated switch 4 and also to the lower end of the bottom bore 57 in the differential sensing device 21. It will be further understood that while the handle 24 occupies all of its positions except the release position, the pipes 61 and 60 are vented to atmosphere via the suppression valve 30.

Slidably mounted in the bottomed bore 57 in the casing 33 is a piston-type charging valve 63 between which and the top cover 48 is interposed a spring 64 which is effective in the absence of fluid under pressure in the passageway 60, to bias the charging valve 63 downward until its lower end contacts the bottom of bottomed bore 57.

When the passageway 60 is charged with fluid under pressure in a manner hereinafter described in detail, this fluid under pressure is effective to move the charging valve 63 upward against the yielding resistance of the spring 64 until its upper end abuts the top cover 48. In this position of the charging valve 63 an elongated peripheral annular groove 65 formed on the outer periphery of this valve establishes a communication between the hereinbefore-mentioned passageway 58 and a passageway 66 formed in the casing 33 one end of which passageway 66 opens at the wall surface of the bottomed bore 57 at a location above the location at which the passageway 58 opens at the wall surface of the bottomed bore 57. This passageway 66 extends through the casing 33 and the top cover 48 and opens into the chamber 50 above the diaphragm 44. Also formed in the casing 33 is a passageway 67 which at one end opens into the passageway 66 intermediate the ends thereof and at its opposite end opens into the hereinbefore-mentioned passageway 34 in the casing 33 intermediate the ends of this passageway 34.

Opening at the wall surface of the bore 40 adjacent the lower end thereof is one end of a pasageway 68 that extends through the casing 33 and is connected by a correspondingly numbered pipe to the pressure chamber of the hereinbefore-mentioned fluid pressure operated switch 3. A first branch 68a of the passageway 68 extends through the casing 33 and top cover 48 to the exterior thereof. A choke 69 carried by the casing 33 and disposed in the branch 68a serves to control the rate of release of fluid under pressure from the switch 3 to atmosphere while the spool valve 41 occupies its lap position, in which the lower end of this valve 41 abuts the upper side of seated check valve 38 thereby closing communication between the passageway 68 and atmosphere via the counterbore 42 and the cross-drilled bore in valve 41, groove 43 and passageway 54 in casing 33. A second branch 68b of the passageway 68 extends through the casing 33 to the upper side of a check valve 70 within an annular valve seat 71 against which the check valve 70 is biased by a spring 72 interposed between the check valve 70 and a second bottom cover 73. Cover 73 has a port 74 therein and is secured to the casing 33 by any suitable means (not shown). It may be noted that the strength of the spring 72 is selected to be such that the check valve 70 is unseated from its seat 71 at a pressure in the branch 68b and passageway and corresponding pipe 68 which is five pounds per square inch higher than the pressure required to operate the fluid pressure switch 3 to its closed position. In the closed position of switch 3, its normally open contact 75 establishes a circuit between a wire 76 that is connected to a wire 77 in the function selector unit 14 and leading from the positive terminal of a suitable source of electrical power (not shown) and a wire 78 that is connected to a brake application relay (not shown) in the function selector unit 14 to cause energization or pick-up of this relay. Whenever this relay is thus picked up, transmission of the brake application command signal to the slave locomotive or locomotives is made via radio-transmitted signals effected by operation of the coding system 15, transmitter 16 and antenna 17.

As shown in the drawing, one end of a pipe 79 is connected to the hereinbefore-mentioned fluid pressure operated switch 2 and the opposite end of this pipe is connected to a corresponding passageway (not shown) in the engineer's brake valve 11 which passageway leads to the emergency valve 29. It will be understood that while the handle 24 of the brake valve 11 occupies its release position and all other positions except emergency position, the emergency valve 29 ocupies a corresponding position in which it establishes a communication between the pipe and corresponding passageway 79 and atmosphere so that fluid under pressure is completely vented from the fluid pressure operated switch 2. It will be further understood that, upon manual movement of the handle 24 to its emergency position, the emergency valve 29 is moved to a corresponding emergency position in which it establishes a communication through which fluid under pressure may flow from the main reservoir 6 to the switch 2 via pipe and corresponding passageway 62, a peripheral annular groove (not shown) on the emergency valve 29, and the passageway and corresponding pipe 79 to effect operation of switch 2 to its closed position. In the closed position of normally open contact 80 of switch 2 a circuit is established between a wire 81 that is connected to the hereinbefore-mentioned power supply wire 77 to a wire 82 that is connected to an emergency relay (not shown) in the function selector unit 14 to cause energization of pickup of this relay. Whenever this relay is thus picked up, transmission of the emergency brake application command signal to the slave locomotive is made via radio-transmitted signals effected by the coding system 15, transmitter 16 and antenna 17.

The main reservoir 6 is charged with fluid under pressure by the usual fluid compressor (not shown) carried on the locomotive.

OPERATION

Let it be supposed that a locomotive is provided with the brake control apparatus shown in the drawing and that this locomotive is the lead locomotive in an RMU train consist. Let it be further supposed that another locomotive is coupled between two cars in the train which may be a distance from the lead locomotive and that the brake control equipment on this slave locomotive includes, with the exception of the brake function switch unit 1 and the differential sensing device 21, the same brake control equipment as shown in the drawing with the addition of a brake control center which may be, such as, for example, an A–410 Brake Control Center manufactured by the aforesaid Westinghouse Air Brake Division. It will be understood that this brake control equipment on the slave locomotive is operative in response to the radio-transmitted signals from the lead locomotive to control the pressure in the equalizing reservoir on this slave locomotive and correspondingly the pressure in that portion of the train brake pipe extending in both directions from this slave locomotive.

After a train is made up the lead and slave locomotive control equipments must be conditioned as follows:

(1) The controls on the lead locomotive set for lead operation.
(2) The selector valve 32 of the brake valve 11 on both the lead and the slave locomotive set in freight position.
(3) The power supply switch of the selector and indicator console 20 shown in the drawing is set in power ON position, it being understood that fluid pressure brake switch on this console 20 is set in an IN position, subsequent to the setting of this power supply switch in its power ON position.
(4) The controls on the slave locomotive set for trailing operation, except for the fluid pressure brakes, which must be set for lead operation.
(5) The handle 24 of the brake valve 11 on the slave locomotive must be moved to its brake release (i.e. running position).

(6) The function selector unit on the remote locomotive set in power ON position.

In order to initially effect charging of the brake pipe 10 on the lead locomotive and the train brake pipe that extends back through each car in the train and the brake equipment on each of these cars, the engineer on the lead locomotive will manually move the handle 24 of the brake valve 11 on this locomotive to its brake release position.

Also, it may be assumed that a regulating spring (not shown) of the self-lapping control valve 23 of the brake valve 11 on both the lead and the slave locomotive has been manually adjusted by means of an adjusting screw 83 so that this control valve 23 will provide in its delivery chamber (not shown) and in the equalizing reservoir 25 connected thereto by the pipes 55 and 56 and branch pipe and corresponding passageway 56a a desired normal pressure, which, for example, may be seventy pounds per square inch.

It will be understood that while the selector valve 32 of the brake valve 11 on each locomotive occupies its freight position, the supply of fluid under pressure from the main reservoir 6 on the respective locomotive to the corresponding equalizing reservoir cut-off valve 31 will be effected, only while the handle 24 occupies its brake release position, to cause opening of this valve. Consequently, fluid under pressure will flow from the delivery chamber of the control valve 23 of the brake valve 11 on the lead locomotive to the corresponding equalizing reservoir 25 and also to the corresponding relay valve 26. The relay valve 26 on the lead locomotive operates in response to this supply of fluid under pressure thereto to effect the supply fluid under pressure from the main reservoir 6 on the lead locomotive to that portion of the train brake pipe connected to this locomotive.

Upon manual movement of the handle 24 of the brake valve 11 on the lead locomotive to its brake release position, the suppression valve 30 of this brake valve will be moved to a position to effect the supply of fluid under pressure from the main reservoir 6 to the switch 4 via pipe and corresponding passageway 62, the suppression valve 30, passageway and corresponding pipe 61 and pipe 60 it being noted that part of the fluid under pressure thus supplied to the pipe 60 flows via the corresponding passageway in the casing 33 to the lower end of the bottomed bore 57 in this casing.

Fluid under pressure thus supplied to the fluid pressure operated switch 4 operates its normally open contact 84 to closed position in which it establishes a circuit between a wire 85 that is connected to the positive power supply wire 77 and a wire 86 that is connected to a brake release relay (not shown) in the function selector unit 14 to cause energization or pick-up of this relay. Whenever this relay is thus picked up, transmission of the brake release command signal to the slave locomotive is made via radio-transmitted signals effected by the coding system 15, transmitter 16 and antenna 17. When this brake release command signal is received on the slave locomotive it effects energization of a solenoid coil of a brake valve charging cut-out spool valve which is thereupon moved to a position to release fluid under pressure from a pressure chamber of the brake pipe cut-off valve 27 of the brake valve 11 on the slave locomotive. Upon this release of fluid under pressure from the brake pipe cut-off valve 27 on the slave locomotive, the brake valve 11 on this locomotive is rendered effective to supply fluid under pressure to the train brake pipe. Consequently, the supply of fluid under pressure to the train brake pipe is now simultaneously effected by operation of the relay valve 26 of brake valve 11 on both the lead and the slave locomotive until the train brake pipe is charged to the normal pressure carried therein which may be, for example, seventy pounds per square inch and corresponds to the pressure for which the control valves 23 of the two brake valves 11 have been adjusted, as hereinbefore described.

Fluid under pressure supplied to the lower end of the bottomed bore 57 in the casing 33 of the differential sensing device 21, in the manner hereinbefore explained, is effective to move the charging valve 63 upward against the yielding resistance of the spring 64 until its upper end abuts the top cover 48. In this position of the charging valve 63, the groove 65 thereon establishes a communication between the passageway 58 and the passageway 66 which opens into chamber 50 above diaphragm 44. Consequently, fluid under pressure will now flow from the brake pipe 10 to the chamber 50 via branch pipe 59, pipe and passageway 58, groove 65 on charging valve 63, and passageway 66. It will be seen from the drawing that part of the fluid under pressure supplied to the passageway 66 flows therefrom to the volume reservoir 22 via passageway 67, and passageway and pipe 34. Since one end of the passageway 34 opens into the chamber 35, some of the fluid under pressure supplied to this passageway 34 will flow into the chamber 35. Accordingly, it will be apparent that the chambers 35 and 50 and the volume reservoir 22 are all charged to the same pressure as that normally carried in the brake pipe 10.

From the drawing, it can be seen that fluid under pressure supplied to the equalizing reservoir 25 by the control valve 23 in the manner hereinbefore explained will flow from this equalizing reservoir 25 to the chamber 49 below the diaphragm 44 via pipe and passageway 55. Since the pressure in the chamber 49 and the equalizing reservoir 25 is the same as that in the chamber 50 and the brake pipe 10, the spring 52 is effective to move the valve 41 and diaphragm 44 to the position shown in the drawing in which the diaphragm follower 46 abuts the stop 53. In this position of the valve 41 the spring 37 is effective to seat the valve 38 on its seat 39 and fluid under pressure is vented unrestrictedly from the switch 3 to atmosphere via pipe and passageway 68, bore 40, counterbore 42 in valve 41, the crossbore in this valve 41 and the groove 43 thereon, and the passageway 54 in the casing 33. Consequently, contact 75 of the switch 3 is actuated to its open position interrupting the circuit between wires 76 and 78.

Since he brake control valve 12 is connected to the brake pipe 10 by the branch pipe 13, fluid under pressure will flow from the brake pipe 10 to the brake control valve 12 to effect operation thereof to its release position in which it causes fluid under pressure to be completely released from the brake cylinder 5 thereby releasing the brakes on the lead locomotive, and in which it causes the auxiliary reservoir 7, control reservoir 8 and selector volume reservoir 9 to be charged to the pressure carried in the brake pipe 10. Likewise, the brake control valves on all the cars in the train will operate in response to charging of the train brake pipe to the normal pressure carried therein, which may be, for example, as hereinbefore stated, seventy pounds per square inch, to effect a complete release of the brakes on these cars.

The engineer on the lead locomotive may now start the train on its journey to the next terminal or station.

Let it be supposed that after the train has traveled some distance from its starting point, it must descend a grade that requires that the engineer on the lead locomotive effect a brake application. Accordingly, the engineer will move the handle 24 of the brake valve 11 on the lead locomotive arcuately out of its release position and to a position in its application zone corresponding to the degree of reduction of pressure desired in the train brake pipe. Therefore, the self-lapping control valve 23 will now operate in the usual manner to effect a reduction in the pressure in the equalizing reservoir 25, a pressure chamber (not shown) in the relay valve 26 and the chamber 49 in the differential sensing device 21 by an amount corresponding to the amount the handle of the brake valve is moved out of brake release position into its application zone. This reduction of pressure in the above-mentioned chamber in the relay valve 26 causes this relay valve to operate to effect a corresponding reduction of pressure in a second chamber (not shown) in this relay valve, in the brake pipe 10, and in that portion of the train brake pipe extending from the lead locomotive toward the slave locomotive.

The brake control valve 12 on the lead locomotive operates in response to this reduction of pressure in brake pipe 10 to effect the supply of fluid under pressure from the auxiliary reservoir 7 to the brake cylinder 5 to cause an application of brakes on the lead locomotive.

Upon movement of the handle 24 out of its release position and to the desired position in its application zone, the suppression valve 30 is moved to a corresponding position in which communication between the main reservoir 6 and the pipe and passageway 61 is cut off and this pipe and passageway connected to atmosphere via a passageway (not shown) in the suppression valve 30. When fluid under pressure in passageway and pipe 61 and also pipe and passageway 60 is thus released to atmosphere, the spring 64 is rendered effective to move the charging valve 63 downward to the position shown in the drawing in which groove 65 closes communication between the passageways 58 and 66 to trap fluid under pressure in the chambers 50 and 35 and in the volume reservoir 22.

Since the pressure in the chamber 49 and in the equalizing reservoir 25 is now being reduced in the manner previously explained, the pressure trapped in the chamber 50 is effective to deflect the diaphragm 44 downward. This downward deflection of the diaphragm 44 is effective to simultaneously move the valve 41 downward so that its lower end first abuts the upper side of check valve 38 to close communication between the switch 3 and atmosphere and thereafter unseat valve 38 from its seat 39. When valve 38 is thus unseated from its seat 39, a communication is established between the volume reservoir 22 and the switch 3 via pipe and passageway 34, chamber 35, past unseated valve 38, bore 40, and passageway and pipe 68. Consequently, fluid under pressure will flow from the volume reservoir 22 to the switch 3 to operate its contact 75 to its closed position in which it establishes a circuit between wire 76, which is connected to the positive power supply wire 77, and wire 78 that is connected to the hereinbefore-mentioned brake application relay in the function selector unit 14 on the lead locomotive.

It will be noted from the drawing that the chamber 50 above diaphragm 44 is connected to the passageway 34 via passageways 66 and 67, and that the passageway 68 is connected to the inner seated area of the check valve 70 via branch 68b and to atmosphere via branch 68a having choke 69 therein. Consequently, subsequent to unseating of check valve 38 from its seat 39, fluid under pressure will unseat check valve 70 from its seat 71 whereupon fluid under pressure in the volume reservoir 22, switch 3 and chamber 50 will flow to atmosphere past unseated valve 70 and via port 74 until the pressure in chamber 50, switch 3 and volume reservoir 22 is reduced to a value which, as hereinbefore stated, is five pounds higher than the pressure required to operate switch 3 to its closed position. When the pressure in chamber 50 and volume reservoir 22 is thus reduced, the spring 72 will reset check valve 70 on its seat 71 to cut off further flow of fluid under pressure from chamber 50, switch 3 and volume reservoir 22 to atmosphere.

Subsequent to seating of check valve 70 on its seat 71, fluid under pressure in the volume reservoir 22, switch 3 and chamber 50 above diaphragm 44 will flow to atmosphere via branch 68a and choke 69 at a rate controlled by the size of choke 69.

It will be noted that an unrestricted communication etxends from the chamber 49 to the control valve 23 of brake valve 11 via passageway and pipe 55, pipe 56, and branch and corresponding passageway 56a. Consequently, the self-lapping control valve 23 will release fluid under pressure from the chamber 49 below the diaphragm 44 to atmosphere at an unrestricted rate simultaneously as fluid under pressure is released from the chamber 50 above the diaphragm 50 at a restricted rate via choke 69 until the self-lapping control valve 23 moves to its lap position to cut off further release of fluid under pressure from the equalizing reservoir 25 and chamber 49. It should be understood that the reduction of pressure effected in the equalizing reservoir 25 and chamber 49 by operation of the control valve 23 corresponds to the position to which the handle 24 of the brake valve 11 on the lead locomotive was moved in its application zone. From the foregoing, it is apparent that the valve 41 maintains valve 38 unseated from its seat 39 so long as the pressure in the equalizing reservoir 25 is being reduced by operation of the control valve 23.

Upon operation of the self-lapping control valve 23 to its lap position to prevent a further reduction of pressure in chamber 49 below diaphragm 44, fluid under pressure in the chamber 50 and switch 3 will flow to atmosphere via passageways 66, 67 and 34, chamber 35, past unseated valve 38, bore 40, passageway and pipe 68, branch 68a and choke 69 until the pressure in chambers 49 and 50 are substantially equal, whereupon spring 52 will return valve 41 and diaphragm 44 to a lap position in which spring 37 reseats valve 39 on its seat 39 and the lower end of valve 41 abuts the upper side of valve 38.

Subsequent to seating of valve 38 on its seat 39, the fluid under pressure present in the switch 3 will be quickly released to atmosphere via pipe and passageway 68, branch 68a and choke 69 whereupon contact 75 of this switch 3 will be restored to its open position in which the circuit between wires 76 and 78 is interrupted.

As hereinbefore stated, when contact 75 of switch 3 is closed it establishes a circuit to cause pick-up of the brake application relay in the function selector unit 14 which relay, when picked up, causes transmission of the brake application command signal to the slave locomotive via radio-transmitted signals effected by operation of the coding system 15, transmitter 16 and antenna 17. It will be understood that the brake control equipment on the slave locomotive is operative in response to receiving these signals to effect a reduction of pressure in the equalizing reservoir on this slave locomotive and a corresponding reduction of pressure in those portions of the train brake pipe connected to this slave locomotive so long as these radio-transmitted signals are received from the lead locomotive. Since the switch 3 on the lead locomotive remains in its closed position substantially so long as fluid under pressure is released from the equalizing reservoir 25 on the lead locomotive to atmosphere by operation of the self-lapping control valve 23 on this lead locomotive, it is apparent that the brake control equipment on the slave locomotive is concurrently operative to release fluid under pressure from the equalizing reservoir on the slave locomotive to atmosphere for substantially the same length of time as fluid under pressure is released from the equalizing reservoir on the lead locomotive. It follows, therefore, that the relay valves 26 on the lead and on the slave locomotives operate in response to the reduction of pressure in the corresponding equalizing reservoir to effect a corresponding reduction of pressure in the portion or portions of the train brake pipe that is connected to the respective locomotive. Thus, operation of the brake control valves on both locomotives and on all the cars in the train occurs substantially simultaneously to effect a brake application on the entire train.

The brakes on the entire train can be subsequently released by the engineer on the lead locomotive manually moving the handle 24 of the brake valve 11 on this locomotive out of the position it occupies in its application zone and back to its brake release position. Upon return of the handle 24 to its brake release position, the corresponding control valve 23 operates to effect the supply of fluid under pressure to the equalizing reservoir 25 and relay valve 26 on the leading locomotive whereupon this relay valve operates to effect the supply of fluid under pressure from the main reservoir 6 on this locomotive to that portion of the train brake pipe connected thereto. As aforestated, upon movement of the handle 24 to its brake release position, fluid under pressure is supplied to the switch 4 to cause closing of contact 84 and the pick-up of the corresponding brake release relay whereupon transmission of the brake release command signal to the slave locomotive is made via radio transmitted signals. Consequently, the relay valve 26 of brake valve 11 on the slave locomotive operates, in the manner hereinbefore described to effect the supply of fluid under pressure to that portion of the train brake pipe connected to this slave locomotive. Accordingly, fluid under pressure is now supplied to the train brake pipe simultaneously by operation of the relay valve 26 of the brake valve 11 on both the lead and the slave locomotives until the train brake pipe is charged to the normal pressure carried therein. As the train brake pipe is thus charged, the brake control valves on the cars in the train operate in response thereto to effect a release of the brakes on these cars.

Let it now be supposed that while the brakes on the entire train are released and the train is traveling along the track toward its destination it becomes necessary that the engineer on the lead locomotive effect an emergency brake application.

To effect an emergency brake application on the entire train, the engineer on the lead locomotive will move the handle 24 of the brake valve 11 on this locomotive from its release position to its emergency position to effect a reduction of pressure in the brake pipe 10 and in that portion of the train brake pipe extending from the lead locomotive toward the slave locomotive at a rapid or emergency rate. The control valve 12 on the lead locomotive operates in response to this reduction of pressure in the brake pipe 10 at an emergency rate to effect a corresponding emergency brake application on this locomotive.

When the handle 24 is manually moved by the engineer to its emergency position, the emergency valve 29 is moved to a position to establish a communication via which fluid under pressure is supplied from the main reservoir 6 to the pipe 79 which is connected to the switch 2, whereupon the contact 80 of this switch is moved to its closed position in which it establishes a circuit between the wires 81 and 82 to cause pick-up of the hereinbefore-mentioned emergency relay in the function selector unit 14 on the lead locomotive.

As hereinbefore stated, when this emergency relay is thus picked up, transmission of the emergency application command signal to the slave locomotive is made via radio-transmitted signals effected by the coding system 15, transmitter 16 and antenna 17 on the lead locomotive. It will be understood that the brake control equipment on the slave locomotive is operative in response to the emergency application command transmitted thereto from the lead locomotive via radio signals to effect a reduction of pressure in the brake pipe 10 on the slave locomotive and in the portions of the train brake pipe extending from each end of this slave locomotive at an emergency rate. Accordingly, it will be understood that the brake control valves on both locomotives and on all the cars in the train operate substantially simultaneously in response to a reduction of pressure in the train brake pipe at an emergency rate to effect an emergency brake application on the entire train.

When the train has been brought to a stop and all danger has past, the emergency brake application can be released by the enginrer moving the handle 24 of the brake valve 11 on the lead locomotive from its emergency position back to its release position.

Having now described the invention, what I claim as new and desired to secure by Letters Patent is:

1. In a multiple locomotive brake control system for a train of cars having a lead locomotive and a slave locomotive remotely located therefrom, brake control apparatus for the lead locomotive comprising the combination of:
   (a) a normally charged brake pipe, variations of the fluid pressure in which are effective to control brake applications and brake releases on the cars in the train,
   (b) a normally charged equalizing reservoir,
   (c) a brake valve having:
      (i) a relay valve which is subject to the opposing pressure in said equalizing reservoir and said brake pipe and is operative by the differential of the pressures in said equalizing reservoir and in said brake pipe to control the pressure in said brake pipe, and
      (ii) valve means operative to control the pressure in said equalizing reservoir,
   (d) coding and radio signal transmitting means for transmitting command signals from the lead locomotive to the slave locomotive,
wherein the improvement comprises:
   (e) a plurality of fluid pressure operated switches selectively operated to their respective closed positions, accordingly as said brake valve is selectively manually operated to corresponding ones of a plurality of operating positions, and effective when closed to cause said coding and radio signals transmitting means to transmit a corresponding radio signal to the slave locomotive,
   (f) a volume reservoir normally charged to the pressure carried in said brake pipe, and
   (g) valve means subject to the opposing pressure in said equalizing reservoir and in said volume reservoir and operative so long as said valve means of said brake valve is operative to effect a reduction of pressure in said equalizing reservoir to effect the supply of fluid under pressure from said volume reservoir to one of said plurality of fluid pressure operated switches.

2. In a multiple locomotive brake control system for a train of cars, as claimed in claim 1, further characterized in that said one fluid pressure operated switch is effective when subject to fluid under pressure to establish a circuit to cause said coding and radio signal transmitting means to transmit a corresponding brake application command signal to the slave locomotive.

3. In a multiple locomotive brake control system for a train of cars, as claimed in claim 1, further characterized in that said valve means comprises a charging valve for effecting charging of said volume reservoir from said brake pipe, said charging valve being operative to control charging of said volume reservoir from said brake pipe and cut-off to said charging according to the operation of said brake valve.

4. In a multiple locomotive brake control system for a train of cars, as claimed in claim 1, further characterized in that said valve means comprises:
   (a) a fluid pressure operated valve for controlling flow of fluid under pressure from said volume reservoir to said one fluid pressure operated switch, and
   (b) a check valve for releasing fluid under pressure from said one fluid pressure operated switch to atmosphere.

5. In a multiple locomotive brake control system for a train of cars, as claimed in claim 1, further characterized in that said valve means comprises:
(a) a fluid pressure operated valve for controlling flow of fluid under pressure from said volume reservoir to said one fluid pressure operated switch, and
(b) choke means for releasing fluid under pressure from said one fluid pressure operated switch to atmosphere at a rate controlled by the size of said choke means.

6. In a multiple locomotive brake control system for a train of cars, as claimed in claim 1, further characterized in that said valve means comprises:
(a) a fluid pressure operated valve for controlling flow of fluid under pressure from said volume reservoir to said one fluid pressure operated switch,
(b) a check valve for releasing fluid under pressure from said one fluid pressure operated switch to atmosphere at a rapid rate, and
(c) choke means for releasing fluid under pressure from said one fluid pressure operated switch to atmosphere at a lesser rate controlled by the size of said choke means.

7. In a multiple locomotive brake control system for a train of cars, as claimed in claim 1, further characterized in that said valve means comprises:
(a) a movable abutment subject on one side to the pressure in said volume reservoir and on the other side to the pressure in said equalizing reservoir, and
(b) a supply and release valve mechanism operatively connected to said abutment for controlling the supply of fluid under pressure from said volume reservoir to said one fluid pressure operated switch and the release of fluid under pressure from said switch to atmosphere,
(c) said valve mechanism being operative upon equalization of pressure on the opposite sides of said abutment to establish a communication between said switch and atmosphere and operative in response to a reduction in equalizing reservoir pressure on said other side of said abutment to close said communication and establish a communication between said volume reservoir and said switch.

8. In a multiple locomotive brake control system for a train of cars, as claimed in claim 3, further characterized in that said charging valve and a second one of said plurality of switches are simultaneously respectively operated to charging and closed positions upon operation of said brake valve to its brake release position, and in that said second switch in its closed position establishes a circuit to cause said coding and radio signal transmitting means to transmit a brake release command signal to the slave locomotive.

9. In a multiple locomotive brake control system for a train of cars as claimed in claim 3, further characterized in that a third one of said plurlity of switches is operated to its closed position upon operation of said brake valve to its emergency brake application position, and in that said third switch in its closed position establishes a circuit to cause said coding and radio signal transmitting means to transmit an emergency brake application command signal to the slave locomotive.

References Cited

UNITED STATES PATENTS

| 3,374,035 | 3/1968 | Howard | 303—20 |
| 3,380,399 | 4/1968 | Southard et al. | 105—61 |
| 3,402,972 | 9/1968 | Cooper et al. | 303—20 |

DUANE A. REGER, Primary Examiner

U.S. Cl. X.R.

303—15